(No Model.) 3 Sheets—Sheet 2.
H. HINCKLEY & E. CULVER.
CAR BRAKE AND STARTER.
No. 259,013. Patented June 6, 1882.
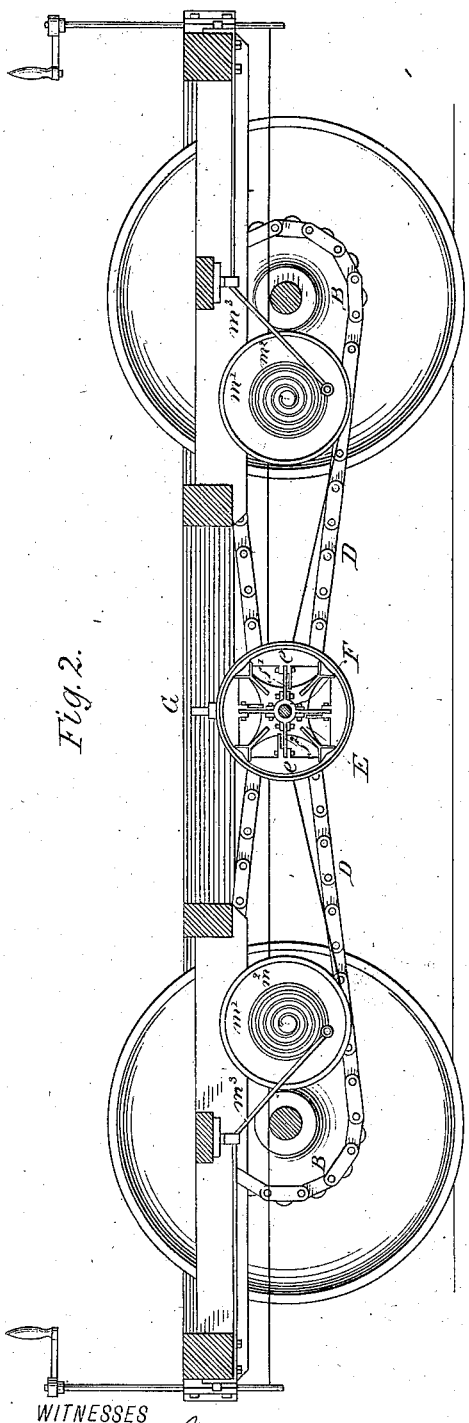
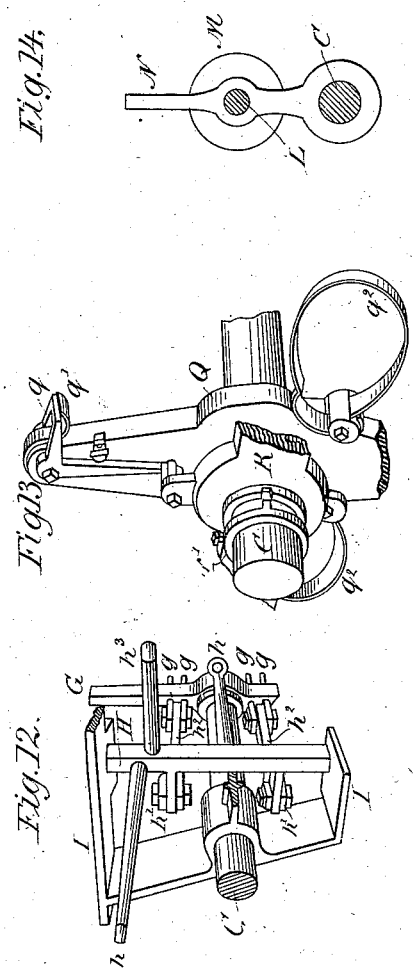
WITNESSES
INVENTORS
Hermon Hinckley
Eber Culver,
By their Attorneys (No Model.) 3 Sheets—Sheet 3.
H. HINCKLEY & E. CULVER.
CAR BRAKE AND STARTER.
No. 259,013. Patented June 6, 1882.
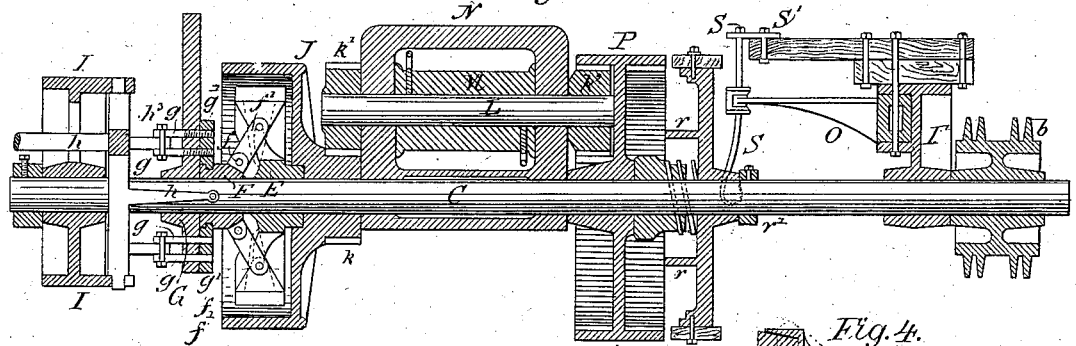
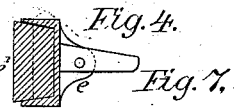
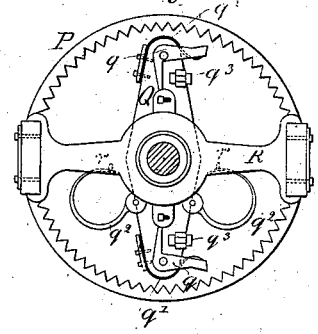
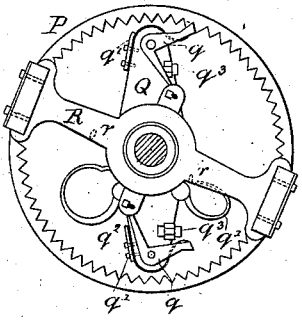
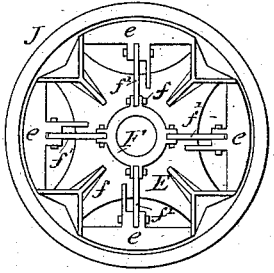
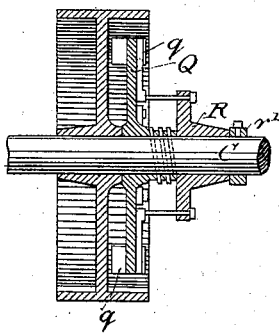
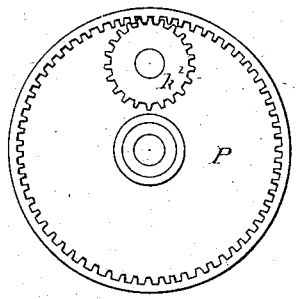
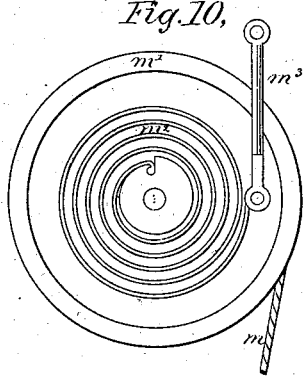
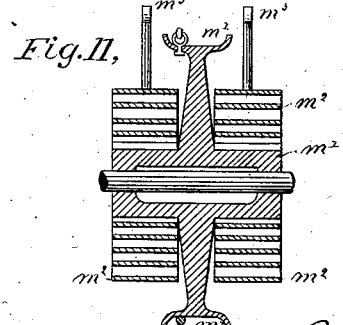
WITNESSES
Wm A. Skinkle
Ernest Alshagen
INVENTORS
Hermon Hinckley
Eber Culver
By their Attorneys
Baldwin, Hopkins, & Peyton
N. PETERS, Photo-Lithographer, Washington, D. C.

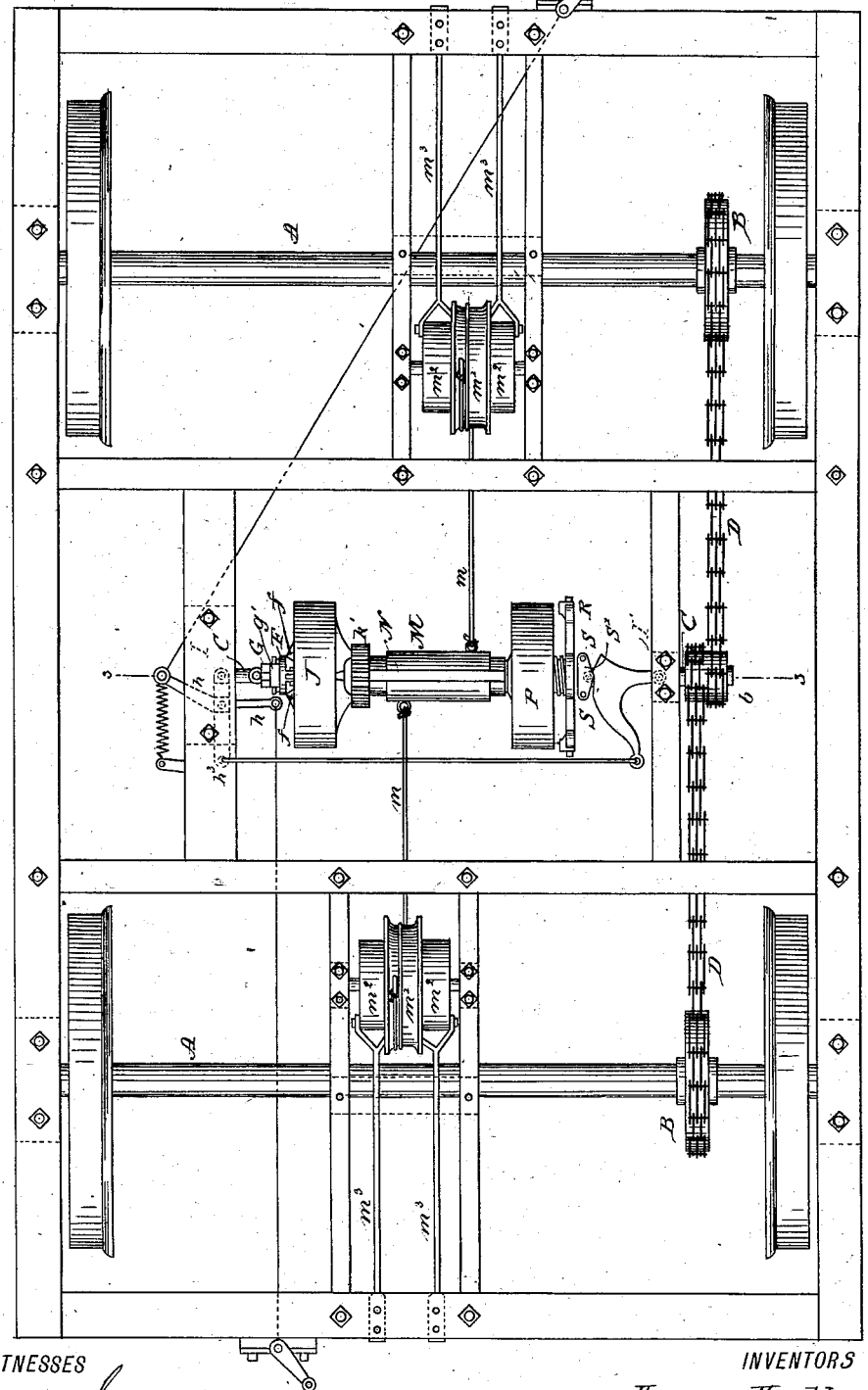

United States Patent Office.

HERMON HINCKLEY AND EBER CULVER, OF PHILADELPHIA, PENNSYLVANIA, ASSIGNORS, BY MESNE ASSIGNMENTS, OF ONE-FOURTH TO MARTHA W. PAGE, OF SAME PLACE.

CAR BRAKE AND STARTER.

SPECIFICATION forming part of Letters Patent No. 259,013, dated June 6, 1882.

Application filed February 14, 1882. (No model.)

*To all whom it may concern:*

Be it known that we, HERMON HINCKLEY and EBER CULVER, both of Philadelphia, in the county of Philadelphia and State of Pennsylvania, have invented certain Improvements in Car Brakes and Starters, of which the following is a specification, reference being had to the accompanying drawings, in which—

Figure 1 is a plan view of a car-frame and trucks with our improvements applied. Fig. 2 is a longitudinal central section of the same; Fig. 3, a section on the line 3 3 of Fig. 1; and Figs. 4 to 14, inclusive, detail views of detached parts for the more perfect illustration of the construction and operation of our improvements.

Our invention relates to a car brake and starter constructed on the same general plan as that patented to Hermon Hinckley in the United States, No. 242,533; and our improvements consist in the devices hereinafter specified in our claims, and which cannot be well understood without first going through with a description in minute detail, which we now proceed to make.

Referring to the letters upon the drawings, A A indicate the car-axles, to which are secured the chain-wheels B B, actuating the counter-shaft C, through the endless chains D D, and the chain-wheel $b$, which is secured to the counter-shaft C.

Secured to counter-shaft C by key or otherwise, and revolving with it, is the spider-wheel E, carrying the brake-shoes $e\ e\ e\ e$, in which are fastened the friction-blocks $e'\ e'\ e'\ e'$.

F indicates a sliding collar secured loosely on counter-shaft C, and having a short sliding motion on the shaft, and revolving with it by means of a spline or other fastening. At one end of the collar are the lugs or ears $f\ f\ f\ f$, set on opposite sides. The links $f'\ f'\ f'\ f'$ connect the sliding collar F with the brake-shoes $e\ e\ e\ e$.

G indicates another sliding collar secured loosely on the counter-shaft C, having arms extending upward and downward. Secured to these arms by means of the eyebolts $g\ g\ g$ $g$ are the guides $g'\ g'$, having their inner ends concave to fit in a groove in the collar F. (See Fig. 3.) The upper end of the collar G is secured to the bottom of the car-body in such manner as to allow a slight motion back and forth in the direction of the length of the counter-shaft C, and to hold the arms in a vertical position.

H indicates an upright pivoted standard, having levers $h\ h$ projecting in opposite directions, and the arms $h'\ h'$ connected with the eyebolts $g\ g\ g\ g$ by links $h''\ h''$. (See Fig. 12.)

I and I' indicate hangers attached to the floor-timbers of the car-body.

J indicates a hollow cylindrical friction brake-wheel, secured loosely on counter-shaft C, having an inside annular frictional surface, and on the opposite side the hub forming a pinion, $k$, engaging the pinion $k'$, which is secured by key or otherwise to the shaft L. On the opposite end of the shaft L is secured the pinion $k''$.

M indicates a chain-drum secured to the shaft L, which shaft is supported by the double bracket or yoke N, secured loosely to the counter-shaft C, and held in a vertical position by having its upper end secured to the floor-timbers of the car-body.

To the chain-drum M are secured one end of each of the chains $m\ m$, the other ends being secured to the chain-wheels $m'\ m'$, on the hubs of which are secured the inner ends of the spiral scroll-springs $m''\ m''\ m''\ m''$. (See Fig. 10.) The outer ends of the springs are held in position by the stirrups $m'''\ m'''$, secured to the car-frame.

From the upright pivoted standard H extends the arm $h'''$, connected by a rod with the cam-lever O. (See Fig. 1.)

P indicates a double-flanged wheel, having on one side internal cog-gear and on the other internal V-shaped ratchet-gear. (See Figs. 5, 6, 8, and 9.) This wheel is loose upon the shaft C.

Q indicates a hub secured to counter-shaft C, by key or otherwise, and revolving with said shaft, having two arms extending in opposite directions. Near the outer ends of each arm are hung the pawls $q$ $q$, which are forced into engagement with the internal ratchet-gear of the wheel P by the pawl-springs $q'$ $q'$.

R indicates a friction-bar with hub secured loosely on shaft C, having a slight oscillating motion on the shaft, and carried forward with it by lugs $r$ $r$ coming in contact with the springs $q''$ $q''$. The pawls $q$ $q$ have each an arm extending toward the shaft C, which arms, coming in contact with lugs on the friction-bar R, force the pawls out of engagement.

On the arms of the hub Q are lugs $q'''$ $q'''$, in which are inserted rubber cushions, against which the arms of the pawls strike to prevent noise. A spiral spring is placed between the hub Q and the hub of R (see Figs. 3 and 8) normally to force the friction-bar out of contact with the wheel P. The wheel P is rotated in a direction opposite to that in which the shaft C is rotating by means of the internal gear and the geared pinions $k'$ and $k''$.

S indicates springs secured to the floor-timbers of the car and extending downward, one on each side of the shaft C, and in contact with the hub of the friction-bar R. When the brake is applied the arm $h'''$ of the pivoted standard H, by means of the connecting-rod, draws the cam-lever O forward and forces the springs S against the friction-bar R, bringing it in contact with the edge of the rim of the wheel P, which has a backward motion on the shaft C, and carries with it the friction-bar R, compressing one of the springs $q''$ $q''$ until stopped by the lug $r$ coming in contact with a lug on hub Q, in which is secured spring $q''$. This backward movement of the friction-bar brings the proper pawl into engagement with the internal ratchet-gear, and it is held there until the brake is released, when the springs $m''$ $m''$ $m''$ $m''$, exerting their force through the chains $m$ $m$, reverse the motion of the wheel P, carrying with it the pawl and the hub Q and starting the car. The springs $q''$ $q''$ act as equalizing-springs to the friction-bar R, and bring it back to its normal position after the force of the springs $m''$ $m''$ $m''$ $m''$ has been expended, so that neither of the pawls will be engaged. The friction-bar is held in such position by a slot in the hub of the bar engaging a corresponding projection in a collar, $r'$, the bar being forced along the shaft C into such position by the action of the spiral spring between the hub Q and bar R. The wheel P, always revolving, when the brake is applied, in the opposite direction to that of the shaft C and of the axles, carries with it in a backward direction the friction-bar, so as to allow the proper pawl to be engaged. The result is that in whichever direction the car may be moving, by simply applying the brake in the usual manner the proper pawl is set for starting the car in the same direction it was moving when stopped.

The operation is as follows: When it is desired to stop the car the driver winds up the brake pull chain by the winch in the usual way, which, acting on the levers $h$ $h$ of the pivoted standard H, slides the collar F forward on the shaft C and brings the brake-shoes $e$ $e$ $e$ $e$ into contact with the inside frictional surface of the wheel J, carrying it forward in the same direction with the shaft C, and, through the geared pinions $k$ and $k'$, revolving the chain-drum M in an opposite direction and winding onto it the chains $m$ $m$, at the same time unwinding them from the chain-wheels $m'$ $m'$ and compressing the spiral scroll-springs $m''$ $m''$ $m''$ $m''$ and stopping the car. To start the car the driver releases the brake, when the springs $m''$ $m''$ $m''$ $m''$, exerting the force stored in them by the momentum of the car, revolve the chain-drum in the opposite direction and through the ratchet start the car. The driver has but the one operation to perform—viz., to apply the brake and release it—which stops and starts the car. The setting of the ratchet in the direction desired is automatic, and always sure to be right, being controlled by the friction-bar R. This bar may have detachable friction-blocks secured at each end, as shown in the drawings, to be replaced when worn. The springs S are connected by a yoke, S', having a small roller, against which the cam-lever O acts to prevent friction.

If desired, the mechanism shown in Fig. 3 may be hung on the axles of the car, either singly or in duplicate, and avoid the use of counter-shaft and endless chains, stopping and starting the car direct from the axles, and the forms of many of the parts may be varied.

It will be observed that the car is stopped through the action of the small pinion $k$ of the wheel J engaging the pinion $k'$—which should be larger than the pinion $k$—of the chain-drum M. The pinions $k$ $k'$ being greater in diameter than the drum would secure a leverage to compress a much stronger spring by winding up the drum than would be possible without having the drum smaller in diameter and the pinion $k'$ of greater diameter than the pinion $k$. When the brake is released the compressed spring acts on the chain-drum—which should be larger than the pinion $k^2$—at the opposite end of the drum-shaft L. This smaller pinion engages with the large internal gear-wheel, P, and by this means we get a leverage in starting, so that we thus provide a leverage for both stopping and starting. The momentum gained in fifteen or twenty feet of travel in stopping is principally expended in two or three feet of travel in starting, thus giving a sure and strong start. The relative size of the drum and pinions named can be varied; but it will be found in practice that the general rule above given, respecting their differences in size or diameter, is of importance.

Having thus described our improvements, what we claim, and desire to secure by Letters Patent, is—

1. The combination, with the hollow friction brake-wheel J, of the spider-wheel E, carrying the brake-shoes $e$ $e$ $e$ $e$, the sliding collars F and G, and the guides $g'$, constructed and operating substantially as set forth.

2. The combination of the wheel P, having the internal V-shaped ratchet-gear, with the hub Q, provided with spring-pawls, as described, and the friction-bar R, substantially as set forth.

3. The combination of the friction brake-wheel J, the spider-wheel E, the sliding collars F and G, and the wheel P, provided with the hub Q and pawl-and-ratchet mechanism, and the friction-bar R, substantially as set forth.

4. The combination of the friction-bar R, the hub Q, and the springs $q''$, and coiled spring between the parts Q and R, substantially as set forth.

5. The combination of the wheel J, the small pinion $k$, the larger pinion $k'$, the drum M, of smaller diameter than the pinions $k\ k'$, and the small pinion $k^2$, and the internal gear-wheel, P, substantially as set forth.

6. The combination, with the friction-bar R, of the springs S and cam-lever O, substantially as set forth.

7. The combination of the pivoted standard H, with its arms and the cam-lever O, springs S, friction-bar R, and wheel P, substantially as set forth.

HERMON HINCKLEY.
EBER CULVER.

Witnesses:
CHARLES BARKER,
NEWTON H. CULVER.